United States Patent
Dunlap et al.

(10) Patent No.: US 10,241,920 B2
(45) Date of Patent: Mar. 26, 2019

(54) SYSTEMS AND METHODS FOR COORDINATING INTERDEPENDENT ASYNCHRONOUS READS

(71) Applicant: Oracle International Corporation, Redwood City, CA (US)

(72) Inventors: Peter Dunlap, Boulder, CO (US); Mark Maybee, Boulder, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 194 days.

(21) Appl. No.: 15/222,640

(22) Filed: Jul. 28, 2016

(65) Prior Publication Data
US 2017/0031828 A1    Feb. 2, 2017

Related U.S. Application Data

(60) Provisional application No. 62/199,779, filed on Jul. 31, 2015.

(51) Int. Cl.
*G06F 12/0877*    (2016.01)
*G06F 12/109*    (2016.01)

(52) U.S. Cl.
CPC ........ *G06F 12/0877* (2013.01); *G06F 12/109* (2013.01); *G06F 2212/1008* (2013.01);
(Continued)

(58) Field of Classification Search
CPC ............. G06F 11/1466; G06F 12/0877; G06F 12/109; G06F 17/30082; G06F 17/30221;
(Continued)

(56) References Cited

U.S. PATENT DOCUMENTS 7,509,329 B1 *   3/2009  Leverett ................ G06F 3/0605
2010/0281230 A1 * 11/2010  Rabii .................... G06F 3/0605
                                                   711/165
(Continued)

OTHER PUBLICATIONS

U.S. Appl. No. 14/815,636, Notice of Allowance dated Feb. 7, 2018, 7 pages.
(Continued)

*Primary Examiner* — Zhuo H Li
(74) *Attorney, Agent, or Firm* — Kilpatrick Townsend & Stockton LLP

(57) ABSTRACT

Implementations described and claimed herein provide a coordination of interdependent asynchronous reads. In one implementation, an input/output request for a target data block stored on a block device at a virtual address is received. A highest level indirect block from which the target data block depends in a hierarchical data structure pointing to the virtual address of the target data block is identified. The highest level indirect block is uncached. A context item is recorded to an input/output structure for the highest level indirect block. The context item indicates that an ultimate objective of a read request for the highest level indirect block is to retrieve the target data block. The input/output request is asynchronously reissued for the target data block upon receipt of the read request for the highest level indirect block.

20 Claims, 5 Drawing Sheets

(52) U.S. Cl.
CPC .......... *G06F 2212/1024* (2013.01); *G06F 2212/152* (2013.01); *G06F 2212/313* (2013.01); *G06F 2212/608* (2013.01); *G06F 2212/657* (2013.01)

(58) Field of Classification Search
CPC ..... G06F 2212/1008; G06F 2212/1024; G06F 2212/152; G06F 2212/313; G06F 2212/608; G06F 2212/657; G06F 11/1456; G06F 12/0868; G06F 17/30138
See application file for complete search history.

(56) References Cited

U.S. PATENT DOCUMENTS

2011/0055261 A1* 3/2011 Makkar ............... H04L 67/1097
707/770
2017/0031823 A1* 2/2017 Ross .................. G06F 12/0862

OTHER PUBLICATIONS

U.S. Appl. No. 14/815,636, Non-Final Office Action dated Sep. 25, 2017, 15 pages.
Wenisch et al., Making Address-Correlated Prefetching Practical, IEEE Micro, vol. 30, Issue No. 1, 2010, pp. 50-59.

* cited by examiner

SYSTEMS AND METHODS FOR COORDINATING INTERDEPENDENT ASYNCHRONOUS READS

CROSS-REFERENCE TO RELATED APPLICATIONS

The present application claims priority under 35 U.S.C § 119 to U.S. Provisional Patent Application No. 62/199,779, entitled "Coordination of Interdependent Asynchronous Reads" and filed on Jul. 31, 2015, which is incorporated by reference in its entirety herein.

TECHNICAL FIELD

Aspects of the present disclosure relate to data storage systems, and in particular, to systems and methods for coordinating interdependent asynchronous reads in a data storage device.

BACKGROUND

The continuous expansion of the Internet, the expansion and sophistication of enterprise computing networks and systems, the proliferation of content stored and accessible over the Internet, and numerous other factors continue to drive the need for large sophisticated data storage systems. Consequently, as the demand for data storage continues to increase, larger and more sophisticated storage systems are being designed and deployed. Many large scale data storage systems utilize storage appliances that include arrays of storage media. Typically, these storage systems include a file system for storing and accessing files. In addition to storing system files (e.g., operating system files, device driver files, etc.), the file system provides storage and access of user data files. For a user to access a file, one or more input/output (I/O) requests are generated to retrieve data blocks associated with the file. Any time an I/O operation is performed, a processing speed of the storage system is impacted as the requested data is retrieved from the storage media. Depending on a type of storage media storing the requested data, there is an increased latency in fulfilling an I/O request. For example, retrieving data from cache memory is faster than retrieving data from random access memory (RAM), which is faster than retrieving data from persistent storage media, such as spinning disks.

Reading data asynchronously from the persistent storage media generally decreases latency. However, some storage devices utilize virtual storage with a hierarchical system for storing data blocks with one or more levels of indirect blocks (metadata) pointing to direct blocks of data stored on persistent storage media. The indirect blocks of data are stored on the persistent storage media separate from the direct blocks. Thus, conventional storage devices require all relevant indirect blocks to be read prior to issuing an asynchronous request, thereby requiring a synchronous read of the indirect blocks during the asynchronous operation and incurring an overhead. Stated differently, to read a block of data, the location of the data must first be ascertained using the indirect block. If the block location is not already read into cache memory, it must first be read into cache memory from the persistent storage media, which incurs synchronous read overhead. Where data is stored with multiple levels of indirect blocks, for example, in a sorted tree structure, there may be multiple synchronous reads of the indirect blocks as the sorted tree is traversed to reach the data block that is the target of the asynchronous read request. Waiting for all the metadata to be accumulated synchronously prior to issuing an asynchronous read impacts performance and increases latency, as the read request is locked until the metadata is accumulated.

It is with these observations in mind, among others, that various aspects of the present disclosure were conceived and developed.

SUMMARY

Implementations described and claimed herein address the foregoing problems by providing a coordination of interdependent asynchronous reads. In one implementation, an input/output request for a target data block stored on a block device at a virtual address is received. A highest level indirect block from which the target data block depends in a hierarchical data structure pointing to the virtual address of the target data block is identified. The highest level indirect block is uncached. A context item is recorded to an input/output structure for the highest level indirect block. The context item indicates that an ultimate objective of a read request for the highest level indirect block is to retrieve the target data block. The input/output request is asynchronously reissued for the target data block upon receipt of the read request for the highest level indirect block.

In another implementation, an input/output request for a target data block stored on a block device at a virtual address is received. The target data block depends from one or more indirect blocks in a hierarchical data structure pointing to the virtual address, and the hierarchical data structure stems from a root node. The hierarchical data structure is traversed in a direction towards the root node to identify a highest level indirect block that is uncached. A context item is recorded to an input/output structure for the highest level indirect block. The context item includes a trigger to reissue the input/output request asynchronously for the target data block upon receipt of a read request for the highest level indirect block.

In yet another implementation, a storage pool has one or more storage media storing data in a hierarchical data structure having one or more indirect blocks stemming from a root node and pointing to a virtual address of a data block. A file system is running on a storage device in communication with the storage pool. The file system includes an input/output manager configured to record a context item to an input/output structure for a highest level indirect block in the hierarchical data structure. The context item includes a trigger to reissue an input/output request asynchronously for the data block upon receipt of a read request for the highest level indirect block.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for coordinating interdependent asynchronous reads. Generally, a user accesses a file stored in a storage device by retrieving target data blocks associated with the file from the storage device. The target data blocks are retrieved using one or more input/output (I/O) requests. To decrease latency in such I/O requests, the storage device may read the target data blocks asynchronously. For example, data blocks may be prefetched from slower storage media into faster storage media in anticipation of the data blocks being requested later as part of an access pattern. Stated differently, if a storage device can predict which data blocks will be requested by identifying an access pattern, the data blocks may be retrieved from slower storage media into faster storage media, so that they are available in the faster storage media when requested.

A prefetch triggered from a read request is intended to be an asynchronous read and thus expected to add no overhead. However, depending on the layout of the data in the storage device, unintended overhead and increased latency may occur. For example, the storage device may provide virtual storage with a hierarchical layout for storing data blocks with one or more levels of indirect blocks (metadata) pointing to data blocks stored on the slower storage media. The indirect blocks are typically stored on the slower storage media separate from the data blocks. To read a target data block pursuant to an I/O request, a location of the target data block on the storage media is obtained using the indirect blocks, which are often read synchronously in response to the I/O request. If synchronous reads are triggered by an asynchronous request, the I/O request incurs unintended overhead and latency. Accordingly, the systems and methods described herein eliminate such synchronous side effects from an asynchronous read request by coordinating dependencies between the indirect block reads and the target data block.

In one aspect, rather than waiting for the necessary metadata to be accumulated synchronously prior to issuing an asynchronous read for a target data block, a consistent internal state of all in-progress asynchronous I/O requests is maintained. New asynchronous read requests, along with the associated metadata, are added to the consistent internal state, such that they are issued when the metadata is available. As such, multiple reads and their dependent metadata reads are coordinated and issued efficiently while maintaining their interdependence. Latency is thus decreased during various I/O requests, such as prefetch I/O operations, spacemap I/O operations, and the like.

Figure 1:
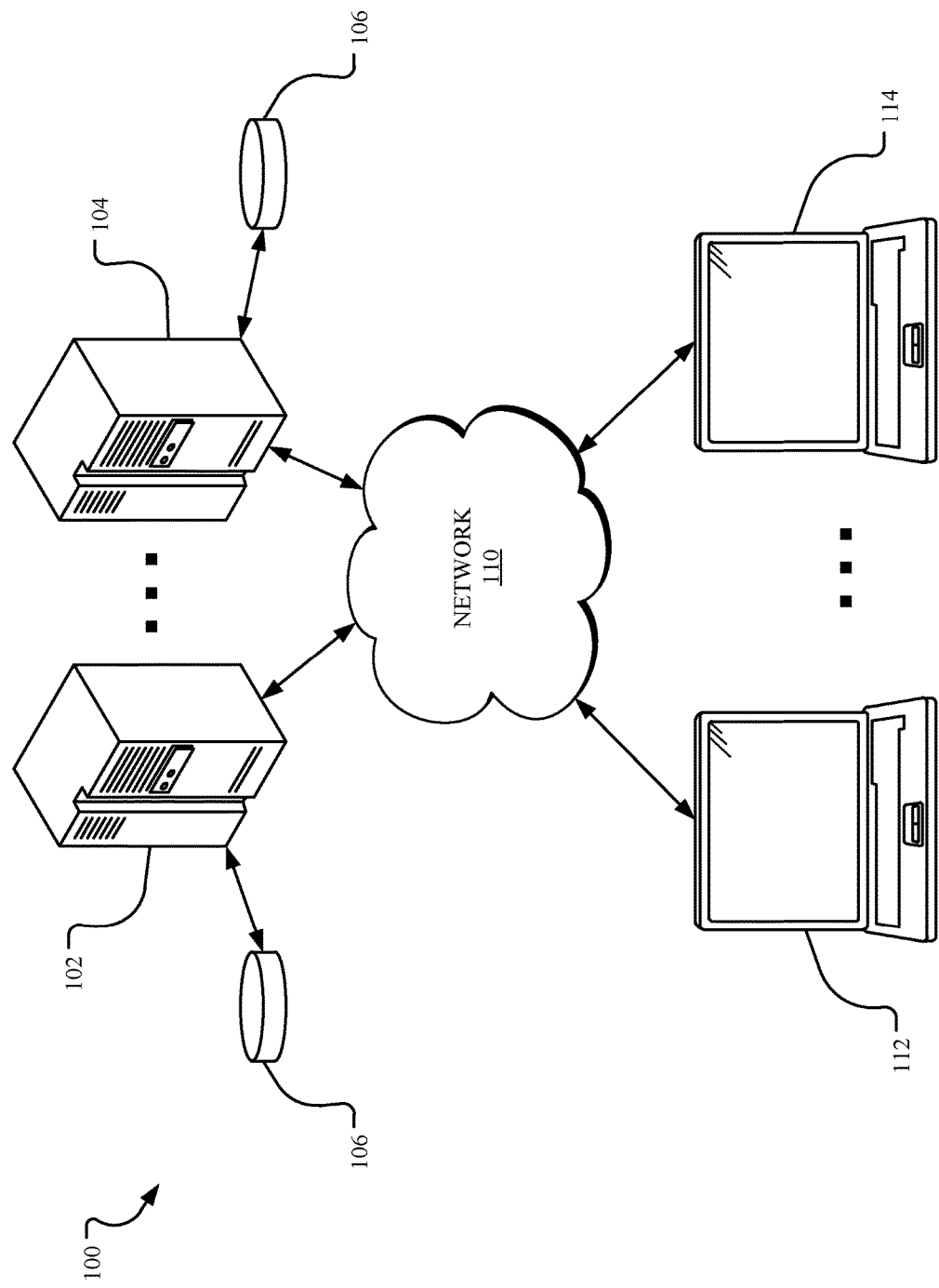
FIG. 1 is an example storage system configured to access data from one or more storage devices by coordinating interdependent asynchronous reads.

To begin a detailed description of an example storage system 100 configured to coordinate interdependent asynchronous reads, reference is made to FIG. 1. Generally, dependent input/output requests are recorded in a data structure for later issue once any dependent blocks, such as one or more levels of indirect blocks pointing to a location of a target data block, have been read into faster storage media from slower storage media.

More particularly, as can be understood from FIG. 1, the storage system 100 includes one or more storage devices 102-104, each managing the storage of data on one or more storage media 106-108, which may involve spinning media (e.g., disk drives) as well as various forms of persistent memory, such as solid state memory. The storage devices 102-104 may each store data in a ladder structure with data for which quick access is needed stored in faster storage media (e.g., one or more levels of cache memory) and other media stored in slower storage media, such as disk drives.

The storage devices 102-104 may each be, without limitation, a storage appliance, including a file-level storage server providing data access over a network 110 to one or more user devices 112-114 on a client network. Such a storage appliance may be, for example, a ZFS storage appliance, which is a combined file system and volume manager designed by Sun Microsystems® in 2005 and now expanded and advanced by Oracle® that allows for data integrity verification and repair, high storage capacities, along with numerous other features and advantages. Although discussed herein in the context of ZFS storage appliance, it will be appreciated that the storage devices 102-104 may each be any type of storage device.

In one implementation, the storage devices 102-104 on a storage network may be accessible by the user devices 112-114 on the client network over the network 110. It will be appreciated, however, that the various networks may comprise an integrated network, and the connections discussed herein between the networks represent but one possible network topology. The various networks may also be local in nature or geographically dispersed, such as with large private enterprise networks or the Internet. The user devices 112-114 are generally any form of computing device capable of interacting with the network 110, such as a terminal, a workstation, a personal computer, a portable computer, a cellphone, a mobile device, a tablet, a multimedia console, and the like. In some implementations, the client network includes one or more user interfaces, including, for example, a business user interface (BUI), permitting a user to interact with a storage device to access data.

The storage devices 102-104 may utilize a storage pool layer having one or more storage pools (often referred to in the ZFS context as "zpools") comprising virtual devices constructed of block devices, such as the storage media 106-108. A block device is any device that moves data in the form of blocks, which may be, without limitation, hard disk drives, solid state drives, optical drives, magnetic drives, and other addressable regions of memory. A volume is a dataset that represents a single block device. A virtual device may span a number of block devices or volumes, and a storage pool may include one or more virtual devices, each including one or more partitions of storage media or one or more storage media.

Traffic to and from the storage devices 102-104 is typically managed by one or more dedicated storage servers located within the storage devices 102-104 or a storage network. A common protocol employed by storage appliances for accessing content, including files, directories, and their associated metadata is a Network File System (NFS). NFS is a widely used distributed file system protocol, originally developed by Sun Microsystems® in 1984 with subsequent versions developed and released by Oracle®. NFS allows the client network to access stored data seamlessly by providing a programming interface permitting the user devices 112-114 to: create and delete files; read and write files; perform seeks within a file; create and delete directories; manage directory contents; and perform other file, directory, or content operations. The operating system utilized by the user devices 112-114 is configured to communicate with the NFS programming interface to manage the file system and the interaction between executing applications with data residing in the storage devices 102-104. Generally, NFS systems manage file system metadata and provide access to files and directories. The metadata describes the location of the files and directories on the storage media 106-108.

In one implementation, data is stored on the storage media 106-108 in hierarchal data structure, such as in a sorted tree structure (e.g., an Adelson Velskii Landis (AVL) tree) with one or more levels of indirect blocks of metadata pointing to a data block at the lowest level. When a read request is issued for a target data block at the lowest level, the storage device 102-104 traverses the hierarchy of indirect blocks pointing to the target data block until a highest indirect block that corresponds to a highest level of the hierarchy that has not yet been read into faster storage media is identified. Stated differently, a highest level indirect block that is uncached is identified.

A data structure and a callback in the form of a context item is hashed in an I/O structure for the highest level indirect block. Using the context item, the storage devices 102-104 reissue a call for the target data block once the I/O for the indirect I/O request completes. The storage devices 102-104 thus bring each level of indirect blocks in the hierarchical data structure into faster storage media asynchronously as a result of the recursive read for the target data block. Stated differently, the storage devices 102-104 recursively reissue the I/O request for the target data block until all levels of indirect blocks in the hierarchy for the target data block are moved into the faster storage media, at which point the I/O request for the target data block can be issued with no dependencies.

In some cases, multiple data blocks will depend on a same set of indirect blocks. Instead of issuing multiple I/O requests for the same indirect blocks, in one implementation, additional I/O reissue requests are joined to the same I/O dependency (indirect block) while it is in flight. For example, the storage devices 102-104 may use an I/O join infrastructure that identifies read requests in an I/O queue for the same indirect blocks or target data blocks and combines read requests for the same logical data into a single read request. Thus, the storage devices 102-104 track multiple I/O requests for target data blocks that need to be reissued once the indirect block upon which the target data blocks depend is moved into the faster storage media.

Figure 2:
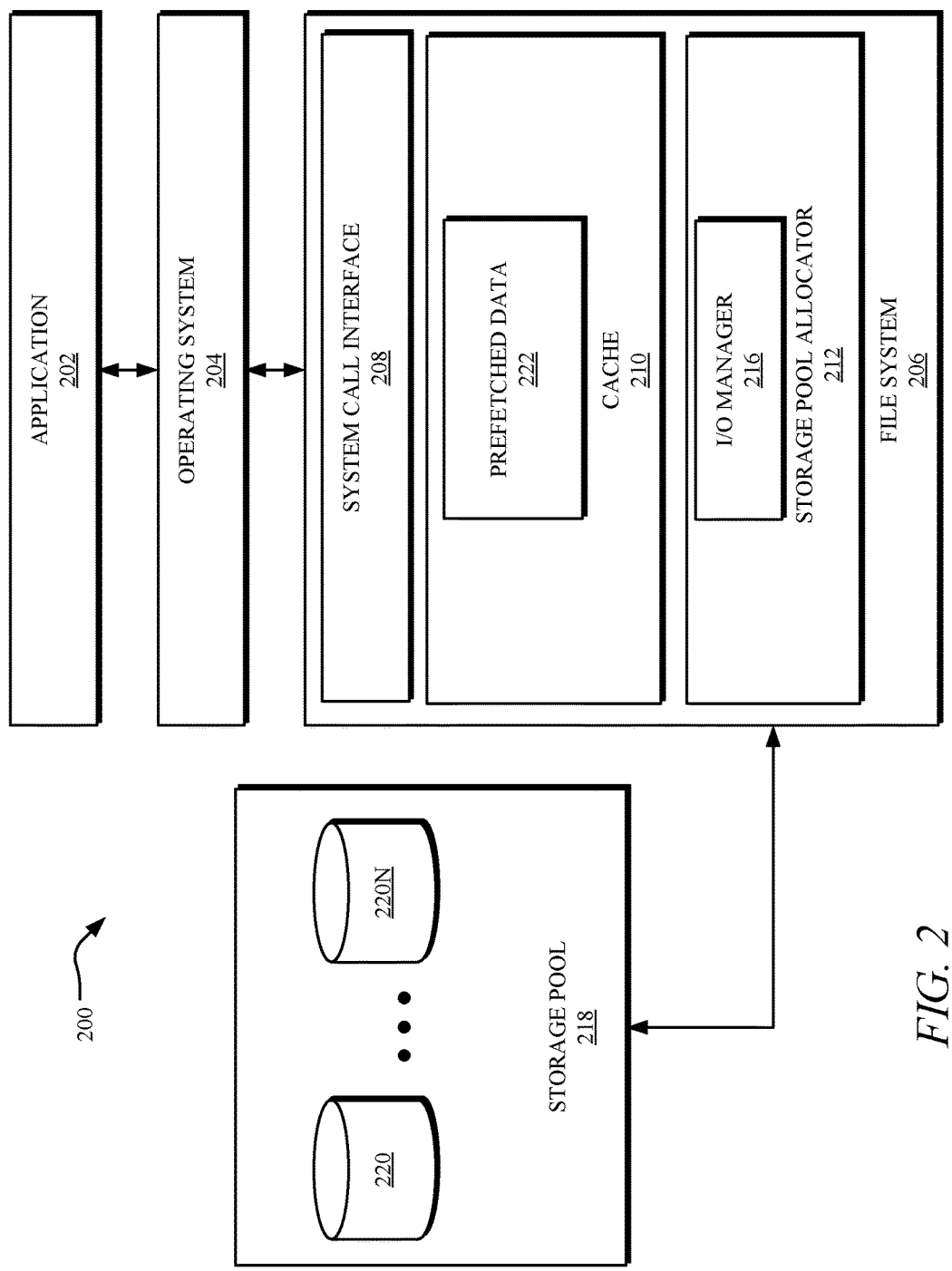
FIG. 2 is an example network file system implementing coordinated interdependent asynchronous reads systems and methods.

Turning to FIG. 2, an example network file system 200 implementing coordinated interdependent asynchronous reads systems and methods is shown. In one implementation, the system 200 includes an application 202 interfacing with an operating system 204. The operating system 204 includes functionality to interact with a file system 206, which in turn interfaces with a storage pool 218. The operating system 204 typically interfaces with the file system 206 via a system call interface 208. The operating system 204 provides operations for users to access files within the file system 206. These operations may include read, write, open, close, and/or the like. In one implementation, the file system 206 is an object-based file system (i.e., both data and metadata are stored as objects). More specifically, the file system 206 includes functionality to store both data and corresponding metadata in the storage pool 218.

In one implementation, the storage pool 218 comprises virtual devices constructed of block devices 220-220N. A block device is any device that moves data in the form of blocks, which may be, without limitation, hard disk drives, solid state drives, optical drives, magnetic drives, and other addressable regions of memory. A volume is a dataset that represents a single block device. A virtual device may span a number of block devices or volumes, and the storage pool 218 may include one or more virtual devices, each including one or more partitions of storage media or one or more storage media. Each block may be described by a block id (i.e., the number of the block within a file or object). The block id is then mapped to a data virtual address (DVA), which maps to a specific location on disk in the storage pool 218 and is described by an offset.

The file system 206 may store data in a ladder layout to optimize performance while reducing monetary cost. Thus, in one implementation, the file system 206 includes one or more levels of storage media, including faster storage media, such as cache 210, and the slower storage media stored in the storage pool 218. The cache 210 may include one or more levels. For example, a higher level of the cache 210 may correspond to any tangible storage medium that stores data, and may be a volatile storage media such as direct random access memory ("DRAM"). Certain data, such as frequently-accessed or recently-accessed data, that speeds up the operation of the file system 206 during I/O requests may be stored in the higher level of the cache 210. In one implementation, the higher level of the cache 210 uses a variant of an Adaptive Replacement Cache ("ARC") algorithm. Data allowing for relatively slower access, such as data less frequently or recently used, may be stored in a lower level of the cache 210, with data allowing for even slower access being stored in the storage pool 218. The lower level of the cache 210 may be persistent non-volatile storage, with each level of the cache 210 comprising faster memory and/or storage devices relative to the storage pool 218. In one implementation, the lower level of the cache 210 comprises flash memory based solid state disks. To increase efficiency, the file system 206 may identify access streams and prefetch data associated with the access streams into the cache 210, such that prefetched data 222 associated with the access streams is available faster in the cache 210 when requested by the operating system 204.

In one implementation, operations provided by the operating system 204 correspond to operations on objects. Stated differently, a request to perform a particular operation (i.e., a transaction) is forwarded from the operating system 204, via the system call interface 208, to a data management unit (DMU) 210. In one implementation, the DMU 210 translates the request to perform an operation on an object directly to an I/O request to perform a read operation at a physical location within the storage pool 218. A storage pool allocator (SPA) 212 receives the request from the DMU 210 and reads the blocks from the storage pool 218. In one implementation, the SPA 212 includes an I/O manager 216 and other modules, which may be used by the SPA 212 to read data from the storage pool 218. In one implementation, the I/O manager 216 receives I/O requests and groups the I/O requests into transaction groups for processing.

The I/O manager 216 may schedule read requests and interface with an I/O bus to fulfill the read requests from the slower storage media (e.g., the storage pools 218). The I/O bus may have limited bandwidth and speed. In one implementation, the I/O manager 216 schedules an order of the performance of reads within an I/O request queue or similar data structure. For example, the requests in the I/O request queue may be ordered based on a read priority, an order in which the read request was received, and/or the like. The I/O manager 216 may implement first-in-first-out operations, as well as listing in-progress I/O operations where requests for data blocks have been sent to a storage device in the storage pool 218, but the data block has yet to be returned to the I/O manager 216.

The I/O request queue may place prioritized requests ahead of other requests. Read requests may be assigned a priority based on whether the read request is a low priority request (e.g., a prefetch request) or a request for immediate use. The priority of a given request in the I/O request queue may be identified with a priority tag. In one implementation, the I/O manager 216 may dynamically update the priority of a request and move the request ahead in the I/O request queue according to the upgraded priority. For example, where an I/O request has been pending in the I/O request queue for a preset length of time without fulfillment, the I/O request may be promoted to the prioritized requests 1004. Stated differently, the I/O manager 216 may assign a deadline to an I/O request, and if the deadline passes, the I/O request is updated in priority.

As discussed herein, reading data from faster storage media, such as the cache 210, is faster than reading data from the storage pool 218. If data requested by the operating system 204 is stored in the storage pool 218, the time spent waiting for the file system 206 to respond to the request may be lengthy. As a result, with users issuing many requests for data at any given time, system performance would be greatly reduced. Accordingly, to increase efficiency, the file system 206 coordinates interdependent asynchronous I/O requests.

The storage pool 218 stores data in a hierarchical data structure utilizing one or more levels of indirect blocks of metadata pointing to a location of data blocks stored on the block devices 220-220N. Such a hierarchical data structure may be used in systems where a file is limited to a certain number of blocks. The indirect blocks may be stored on the block devices 220-220N separately from the data blocks containing the file data. Generally, the larger the size of the file, the more levels of indirect blocks.

To respond to an asynchronous I/O request for a target data block from the operating system 204 through the DMU 210, the SPA 212 needs to identify a location of the target data block on the block devices 220-220N. Because some or all of the indirect blocks pointing to the target data block may not be stored in the cache 210 (i.e., uncached) of the file system 206, the SPA 212 lacks the location of the target data block to be able to complete the I/O request.

Conventionally, a storage device would hold a lock on the target data block of the I/O request until each of the indirect blocks associated with the target data block were synchronously read into cache, and when that was complete, the storage device would issue the I/O request for the target data block asynchronously. While the target data block was blocked waiting for the I/O request to complete, other users were prevented from accessing the target data block and performance is impacted by the blocked threads.

Accordingly, in one implementation, the file system 206 leverages the interdependence of a target data block and the indirect blocks in a hierarchical data structure to coordinate asynchronous reads of the various blocks. As an example, a hierarchical data structure for a file may include a root node at a highest level and data blocks on a level L0 with indirect blocks on a level L4 pointing to a level L3 and so on until a level L1 points to the data blocks on the level L0. In response to an asynchronous read request for a target data block on L0, the file system 206 traverses the hierarchical data structure pointing to the target data block to identify a highest uncached indirect block (e.g., an indirect block on L3). In one implementation, the highest uncached indirect block is identified by locating a lowest level of the hierarchical data structure stored in in the cache 210 of the file system 206 (e.g., the root, an indirect block on L4, etc.).

A context item is recorded for the indirect block on L3, such that when the indirect block on L3 is moved into the cache 210 from the storage pool 218, a call back causes the I/O request for the target data block on L0 to reissue. The indirect block on L3 is thus in the cache 210, but other indirect blocks between the indirect block on L3 and the target data block on L0 (e.g., indirect blocks on L2 and L1) may not yet be moved to the cache 210. Thus, the process is repeated at the next level in the hierarchical data structure (e.g., the indirect block on L2), until the reissue of the I/O request for the target data block on L0 returns the target data block on L0 into the cache 210 of the file system 206.

In some cases, various blocks in the hierarchical data structure may already be cached from other reads. For example, for an I/O request issued for a target data block on L0, the file system 206 may have previously issued an I/O request for an indirect block on L1 in connection with another data block depending from that indirect block. In this case, the indirect block on L1 may be stored in the cache 210 but not the target data block on L0 or other indirect blocks. Thus, the file system 206 may identify a pointer to the next missing block and issue an I/O request for the missing block. A context item is recorded with the missing block, such that when the I/O request for the missing block is completed, the I/O request for the target data block on L0 is reissued. The file system 206 iterates through this process until the target data block L0 is retrieved into the cache 210.

To prevent multiple duplicate I/O requests, for example, for an indirect block, the file system 206 may detect an I/O request in progress and join the I/O request in flight. A context item is added for each target data block depending from the indirect block, such that a callback is issued when the I/O request for the indirect block completes, the I/O requests are reissued for each target data block requested that depends from the indirect block.

Stated differently, in some cases, multiple data blocks and/or indirect blocks may depend from the same indirect block. The file system 206 ensures that enough indirect blocks are read to complete the read request for a target data block but unrelated indirect blocks and/or data blocks are not read unnecessarily. Any number of I/O requests may be in flight and converged on an indirect block. The I/O requests for different target data blocks depending from the indirect block will converge at the indirect block and will fan out from there until the target data blocks are retrieved.

For example, the file system 206 may process read requests for three different target data blocks scattered throughout a file stored on the block devices 220-220N. The file system 206 reads the highest level of uncached indirect block with context items noting that the ultimate goal of the read is to retrieve these target data blocks. This read prompts the file system 206 to read two indirect blocks. One of the two indirect blocks has context items for the first target data block and the second target data block, and the other of the two indirect blocks has a context item for the third target data block. The context items cause the requests for the first and second target data blocks on one hand and the third target data block on the other to reissue, and because no additional indirect blocks are missing, the file system 206 knows the location of blocks the three target data blocks on the block devices 220-220N. The file system 206 thus retrieves the three target data blocks from the storage pool 218 into the cache 210 of the file system 206.

Figure 3:
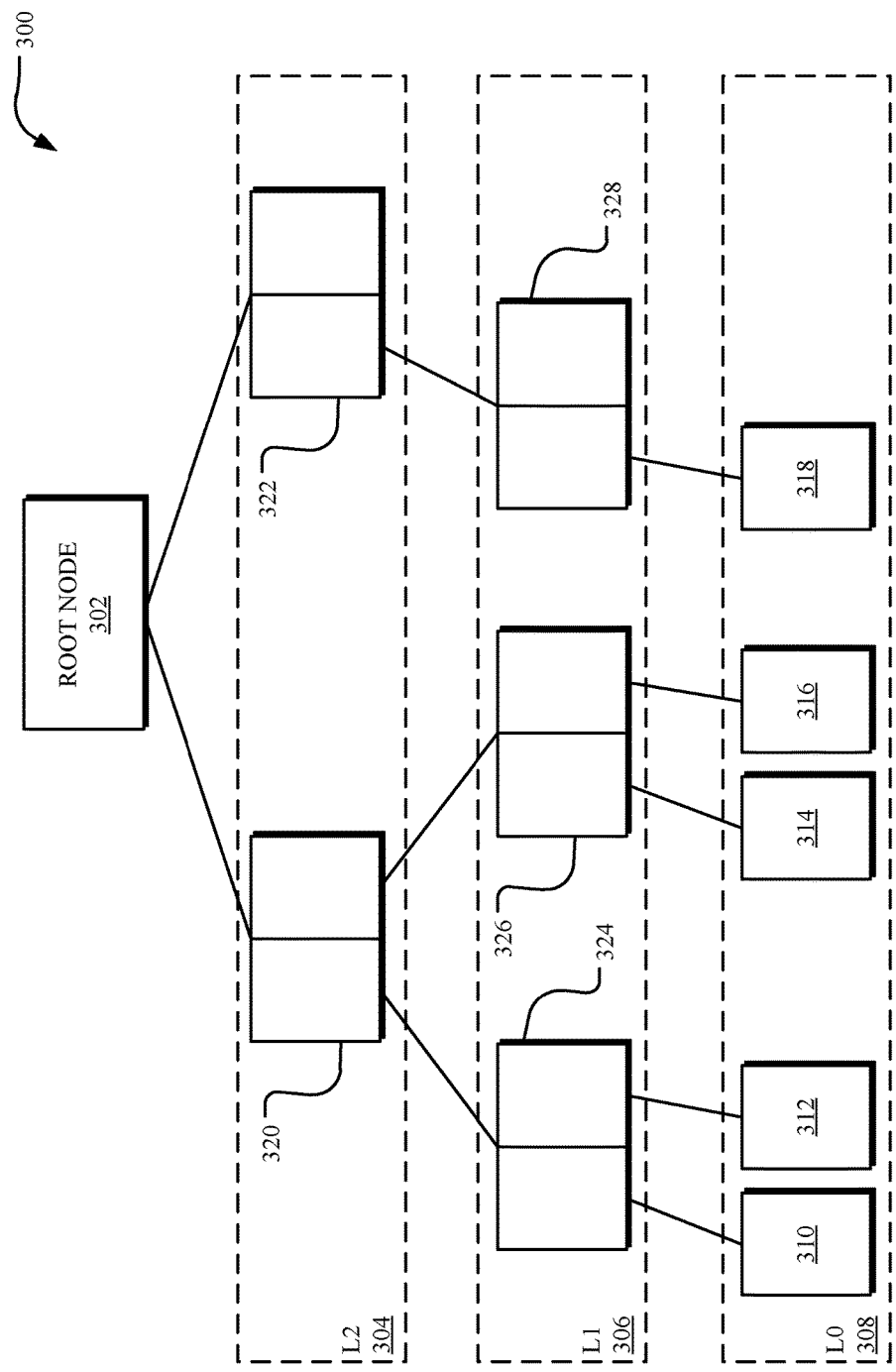
FIG. 3 shows an example hierarchical data structure for a data object such as a file.

Referring to FIG. 3, an example of a hierarchical data structure 300 for a data object, such as a file is shown. In one implementation, the hierarchical data structure 300 includes a root node 302 with a first level 304 of indirect blocks (e.g., indirect blocks 320-322) pointing to a second level 306 of indirect blocks (e.g., indirect blocks 324-328), which point to a lowest level 308 of data blocks (e.g., data blocks 310-318). It will be appreciated that the hierarchical data structure 300 is exemplary only and illustrative in nature and that a hierarchical data structure may include any number of levels and/or blocks with a various layouts.

As can be understood from FIG. 3, I/O requests are gathered and added to an I/O structure detailing the I/O requests in progress, thereby maximizing parallelism with asynchronous operations during the read process. In one example, a read request is received for the target data block 310. To fulfill this read request, the intermediate indirect blocks 320 and 324 on the levels 304 and 306, respectively, are needed. The I/O manager 216 locates the root node 302 and traverses the hierarchical data structure 300 to determine whether any of the intermediate indirect blocks 320 and 324 are stored in the cache 210. In one implementation, the I/O manager 216 traverses the hierarchical data structure 300 for the target data block 310 in a direction towards the root node 302 until there is a hit in the cache 210 or the root node 302 is reached. When the root node 302 is reached, there are no blocks in the cache 210 for the file, so the root node 302 is cached, with I/O requests generated for the indirect block 320, the indirect block 324 and the target data block 310.

The I/O manager 216 may receive a read request for the target data block 312 following the request for the target data block 310. In the example of FIG. 3, the target data block 312 depends from the same indirect blocks as the target data block 310. Thus, the indirect data blocks 320 and 324 needed to complete the read request for the target data block 312 are already stored in the cache 210, so the I/O manager 216 issues the I/O request for the target data block 312 using this information.

In one example, after receiving the read request for the target data block 312, the I/O manager 216 may generate read requests for the target data blocks 314, 316, and 318. In one implementation, the read requests are generated during prefetch operations. Stated differently, the I/O manager 216 may identify the requests for the target data blocks 310 and 312 as part of an access sequence and initiate prefetch operations to retrieve the next data blocks in the access sequence into the cache 210. The I/O manager 216 builds up an internal state tracking the I/O requests in progress and the completed I/O requests. This I/O data structure permits prefetch operations to continue without having to wait for synchronous reads of indirect blocks to complete. The I/O manager 216 thus reads blocks as asynchronous events with I/O requests for the same block being joined to in-progress requests, thereby eliminating multiple duplicative read requests.

For example, to complete a read request for the target data blocks 314 and 316, the indirect blocks 320 and 326 are needed. Rather than issue multiple read requests for the indirect blocks 320 and 326, the I/O manager 216 identifies if either are uncached and joins the I/O requests for both the target data blocks 314 and 316 to the uncached indirect blocks, so that the I/O requests are completed at the same time. More particularly, the I/O manger 216 determines that the highest level uncached indirect block for the target data block 314 is the indirect block 326 because the indirect block 320 was previously cached in connection with the read request for the target data block 310. Because the indirect block 326 is also needed for the target data block 316, the I/O manager 216 records a context item to the indirect block 326 to trigger I/O requests for both the target data block 314 and the target data block 316 in connection with the read request for the indirect block 326. Thus, when the read request for the indirect block 326 completes, I/O requests for the target data blocks 314 and 316 are triggered to proceed.

In this example, the target data block 318 depends from the indirect blocks 322 and 328. The I/O manager 216 determines that the highest level uncached indirect block is the indirect block 322. Accordingly, a context item is recorded at the indirect block 322 for the indirect block 328, which has a context item recorded for the target data block 318. When the I/O request for the indirect block 322 completes, an I/O request for the indirect block 328 is triggered, along with any other joined I/O requests. When the I/O request for the indirect block 328 completes, an I/O request for the target data block 318 and any other joined I/O requests are triggered.

Thus, as I/O requests are completed, the blocks are moved into the cache 210 and accumulate for later reads with overlapping dependencies until evicted from the cache 210. Dependent I/O requests are recorded as context items for later issue once any dependent blocks, such as the higher levels 304 and 306 of indirect blocks, have been read into the cache 210. The I/O requests are completed as asynchronous events.

Figure 4:
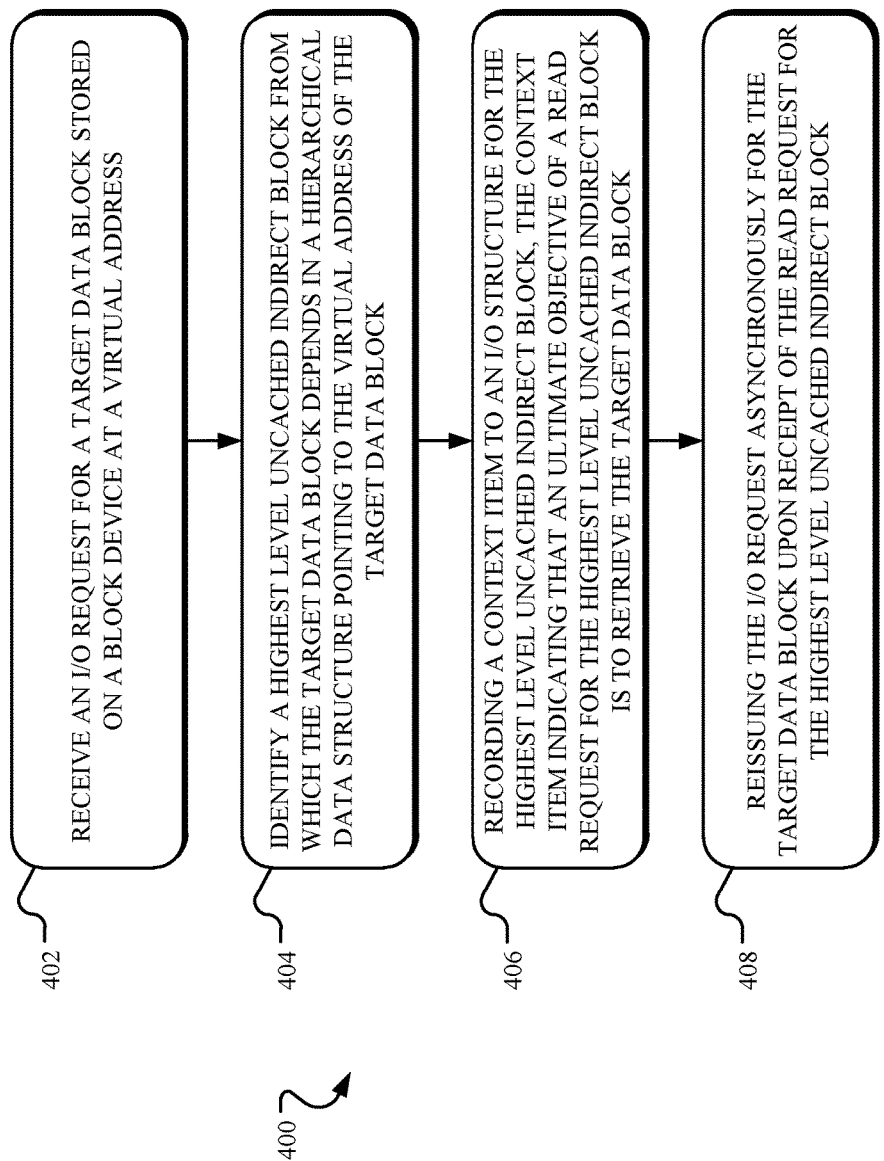
FIG. 4 illustrates example operations for coordinating interdependent asynchronous reads.

Turning to FIG. 4, example operations 400 for coordinating interdependent asynchronous reads are shown. In one implementation, an operation 402 receives an I/O request for a target data block stored on a block device at a virtual address. The I/O request may be received as part of a request to prefetch a set of data blocks into a cache memory. In one implementation, the operation 402 receives the I/O request from a computing device.

An operation 404 identifies a highest level indirect block from which the target data block depends in a hierarchical data structure pointing to the virtual address of the target data block. The highest level indirect block is uncached. It will be appreciated that uncached refers to the indirect block being stored in slower storage media, such as the block devices 120-120N. Stated differently, the highest level indirect block is stored on slower storage media prior to a point at which it is moved to faster storage media, such as the cache 210. The hierarchical data structure may be a sorted tree structure or any other data structure with a hierarchical layout.

In one implementation, the operation 404 identifies the highest level indirect block by traversing the hierarchical data structure in a direction towards a root node until a cached indirect block or the root node is reached. The highest level uncached indirect block may thus be the root node. In another implementation, the operation 404 identifies the highest level indirect block based on a comparison of a state of in-progress I/O requests to a state of completed I/O requests. The state of completed I/O requests may correspond to a list of data blocks stored in a cache memory. In yet another implementation, the operation 404 identifies the highest level indirect block based on a determination of whether one or more indirect blocks from which the target block depends are stored in a cache memory.

An operation 406 records a context item to an I/O structure for the highest level indirect block. The context item indicates that an ultimate objective of a read request for the highest level indirect block is to retrieve the target data block. An operation 408 reissues the I/O request for the target data block asynchronously upon receipt of the read request for the highest level indirect block. Stated differently, the context item includes a trigger to reissue the I/O request asynchronously for the target data block upon receipt of a read request for the highest level indirect block.

Figure 5:
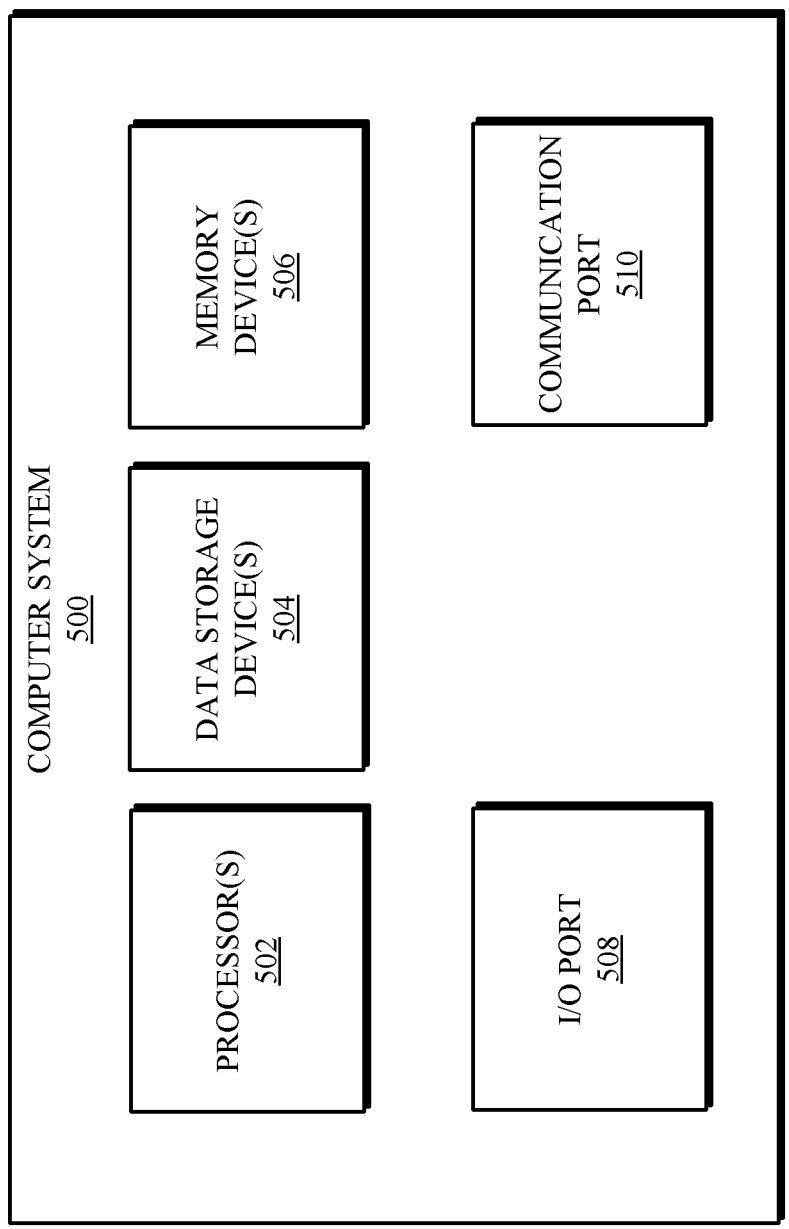
FIG. 5 is an example computing system that may implement various systems and methods of the presently disclosed technology.

Referring to FIG. 5, a detailed description of an example computing system 500 having one or more computing units that may implement various systems and methods discussed herein is provided. The computing system 500 may be applicable to the patient controller, the provider controller, the patient user device, the provider user device, the care delivery interfaces, the communication manager device, the control center, and other computing or network devices. It will be appreciated that specific implementations of these devices may be of differing possible specific computing architectures not all of which are specifically discussed herein but will be understood by those of ordinary skill in the art.

The computer system 500 may be a computing system is capable of executing a computer program product to execute a computer process. Data and program files may be input to the computer system 500, which reads the files and executes the programs therein. Some of the elements of the computer system 500 are shown in FIG. 5, including one or more hardware processors 502, one or more data storage devices 504, one or more memory devices 508, and/or one or more ports 508-510. Additionally, other elements that will be recognized by those skilled in the art may be included in the computing system 500 but are not explicitly depicted in FIG. 5 or discussed further herein. Various elements of the computer system 500 may communicate with one another by way of one or more communication buses, point-to-point communication paths, or other communication means not explicitly depicted in FIG. 5.

The processor 502 may include, for example, a central processing unit (CPU), a microprocessor, a microcontroller, a digital signal processor (DSP), and/or one or more internal levels of cache. There may be one or more processors 502, such that the processor 502 comprises a single central-processing unit, or a plurality of processing units capable of executing instructions and performing operations in parallel with each other, commonly referred to as a parallel processing environment.

The computer system 500 may be a conventional computer, a distributed computer, or any other type of computer, such as one or more external computers made available via a cloud computing architecture. The presently described technology is optionally implemented in software stored on the data stored device(s) 504, stored on the memory device(s) 506, and/or communicated via one or more of the ports 508-510, thereby transforming the computer system 500 in FIG. 5 to a special purpose machine for implementing the operations described herein. Examples of the computer system 500 include personal computers, terminals, workstations, mobile phones, tablets, laptops, personal computers, multimedia consoles, gaming consoles, set top boxes, and the like.

The one or more data storage devices 504 may include any non-volatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 500 includes one or more ports, such as an input/output (I/O) port 508 and a communication port 510, for communicating with other computing, network, or storage devices. It will be appreciated that the ports 508-510 may be combined or separate and that more or fewer ports may be included in the computer system 500.

The I/O port 508 may be connected to an I/O device, or other device, by which information is input to or output from the computing system 500. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like.

In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to one or more communication interface devices configured to transmit and/or receive information between the computing system 500 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 510 to communicate one or more other machines, either directly over a point-to-point communication path, over a wide area network (WAN) (e.g., the Internet), over a local area network (LAN), over a cellular network, or over another communication means. Further, the communication port 510 may communicate with an antenna or other link for electromagnetic signal transmission and/or reception.

In an example implementation, I/O processing software, a plurality of internal and external databases, source databases, and/or cached data on servers are stored as the memory 308 or other storage systems, such as the disk storage unit 312 or the DVD/CD-ROM medium 310, and/or other external storage devices made available and accessible via a network architecture. I/O processing software, prefetching software, and other modules and services may be embodied by instructions stored on such storage systems and executed by the processor 302.

The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for coordination of interdependent asynchronous reads, the method comprising:
receiving a first input/output request for a first target data block stored on a block device at a first virtual address;
identifying a highest level uncached indirect block from which the first target data block depends in a hierarchical data structure pointing to the first virtual address of the first target data block, the highest level uncached indirect block being uncached;
receiving a second input/output request for a second target data block stored on the block device at a second virtual address;
determining that the highest level uncached indirect block further corresponds to the second target data block and points to the second virtual address of the second target data block;
recording a context item to an input/output structure for the highest level uncached indirect block, the context item including a callback that causes a request for each of the first target data block and the second target data block to be reissued; and
reissuing the first input/output request for the first target data block and the second input/output request for the second target data block asynchronously upon receipt of a read request for the highest level uncached indirect block.

2. The method of claim 1, wherein the highest level uncached indirect block is identified by traversing the hierarchical data structure in a direction towards a root node.

3. The method of claim 2, wherein the hierarchical data structure is traversed until at least one of a cached indirect block from which the first target data block depends is reached or the root node is reached.

4. The method of claim 1, wherein the highest level uncached indirect block is identified based on a comparison of a state of in-progress input/output requests to a state of completed input/output requests.

5. The method of claim 4, wherein the state of completed input/output requests corresponds to a list of data blocks stored in a cache memory.

6. The method of claim 1, wherein the highest level uncached indirect block is identified based on a determination of whether one or more indirect blocks from which the first target data block depends are stored in a cache memory.

7. The method of claim 1, wherein the hierarchical data structure is a sorted tree structure.

8. The method of claim 1, wherein the highest level uncached indirect block being uncached includes the highest level uncached indirect block being stored on slower storage media prior to a point at which the highest level uncached indirect block is moved to faster storage media.

9. The method of claim 8, wherein the faster storage media is a cache media.

10. One or more tangible non-transitory computer-readable storage media storing computer-executable instructions for performing a computer process on a computing system, the computer process comprising:
    receiving a first input/output request for a first target data block stored on a block device at a first virtual address, the first target data block depending from one or more first indirect blocks in a hierarchical data structure pointing to the first virtual address, the hierarchical data structure stemming from a root node;
    traversing the hierarchical data structure in a direction towards the root node to identify a highest level indirect block that is uncached;
    receiving a second input/output request for a second target data block stored on the block device at a second virtual address, the second target data block depending from one or more second indirect blocks in the hierarchical data structure pointing to the second virtual address;
    determining that the highest level indirect block further corresponds to the second target data block and points to the second virtual address of the second target data block; and
    recording a context item to an input/output structure for the highest level indirect block, the context item including a trigger to reissue each of the first input/output request for the first target uncached block and the second input/output request for the second target data block asynchronously upon receipt of a read request for the highest level indirect block.

11. The one or more tangible non-transitory computer-readable storage media of claim 10, wherein the hierarchical data structure is a sorted tree structure.

12. The one or more tangible non-transitory computer-readable storage media of claim 10, wherein the highest level indirect block that is uncached is the root node.

13. The one or more tangible non-transitory computer-readable storage media of claim 10, wherein each of the first input/output request and the second input/output request is received as part of a request to prefetch a set of data blocks into a cache memory.

14. The one or more tangible non-transitory computer-readable storage media of claim 10, wherein the highest level indirect block is stored on disk.

15. A system for coordination of interdependent asynchronous reads, the system comprising:
    a storage pool having one or more storage media storing data in a hierarchical data structure having:
        one or more first indirect blocks stemming from a root node and pointing to a first virtual address of a first data block; and
        one or more second indirect blocks stemming from the root node and pointing to a second virtual address of a second data block;
    a file system running on a storage device in communication with the storage pool, the file system including an input/output manager configured to record a context item to an input/output structure for a highest level indirect block in the hierarchical data structure, the context item including a trigger to asynchronously reissue a first input/output request for the first input/output request for the first data block and a second input/output request for the second data block upon receipt of a read request for the highest level indirect block.

16. The system of claim 15, wherein the highest level indirect block is stored on the one or more storage media.

17. The system of claim 15, wherein at least a portion of the hierarchical data structure is stored in a cache memory of the file system.

18. The system of claim 15, wherein the highest level indirect block is identified by traversing the hierarchical data structure in a direction towards the root node.

19. The system of claim 15, wherein the first input/output request is received from a computing device in communication with the file system.

20. The system of claim 15, wherein each of the one or more first indirect blocks is metadata.

* * * * *